Aug. 24, 1926.
D. J. STRICKLAND
BRICK DUMPING APPARATUS
Filed Sept. 8, 1924 14 Sheets-Sheet 8
1,597,119
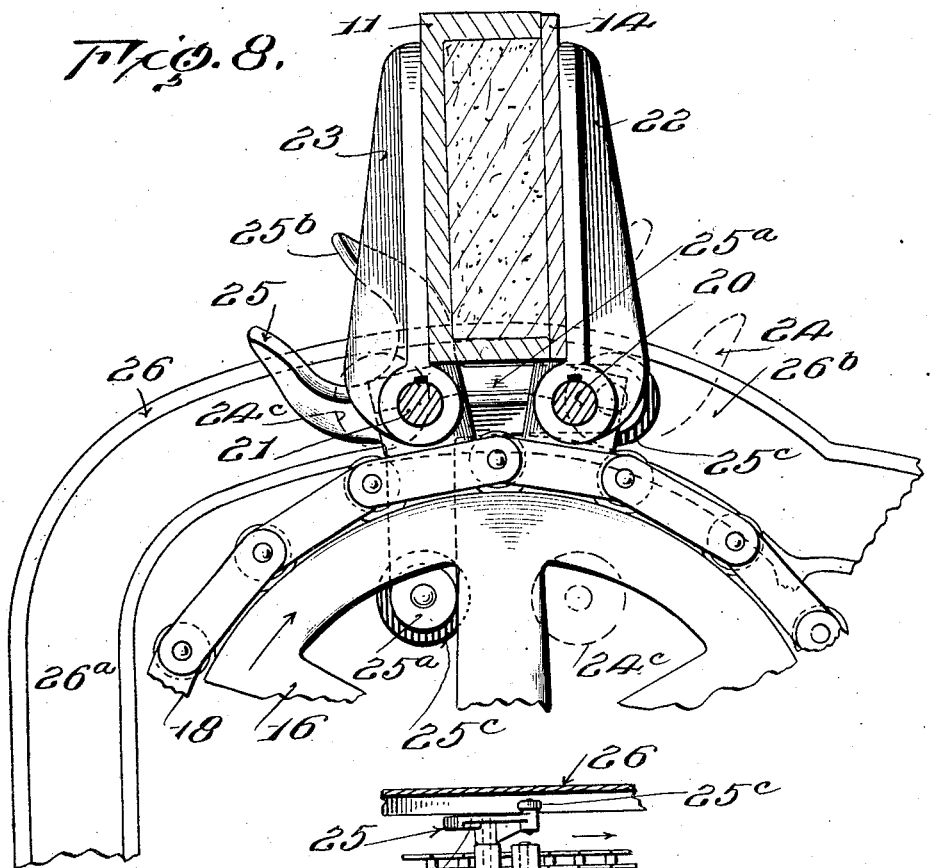
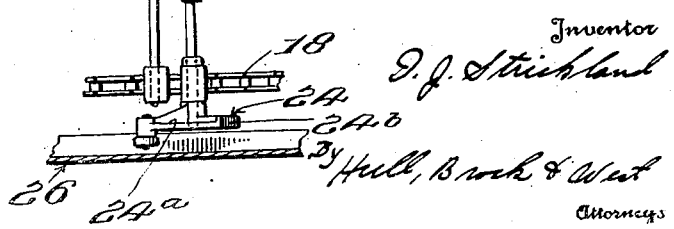

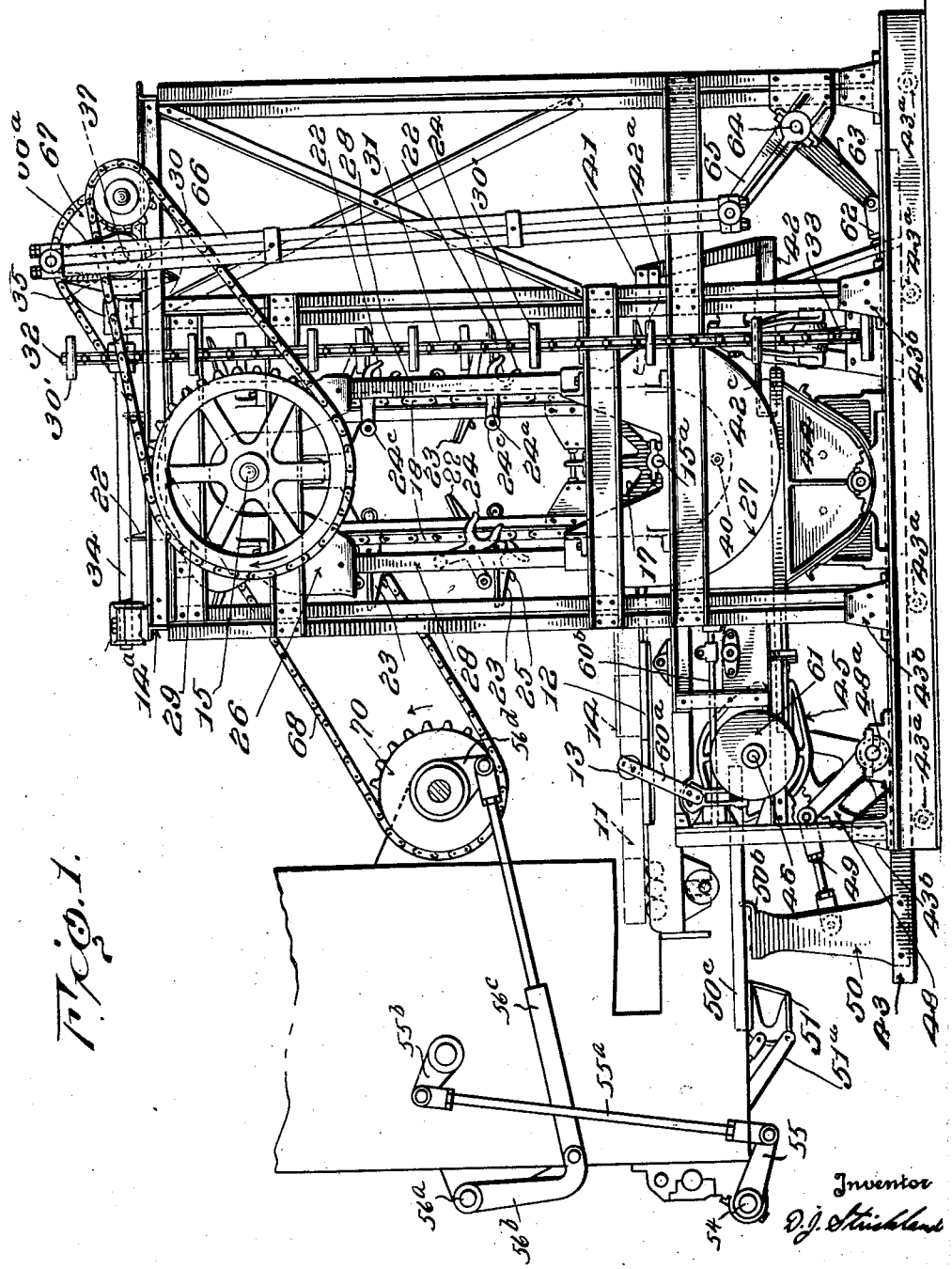

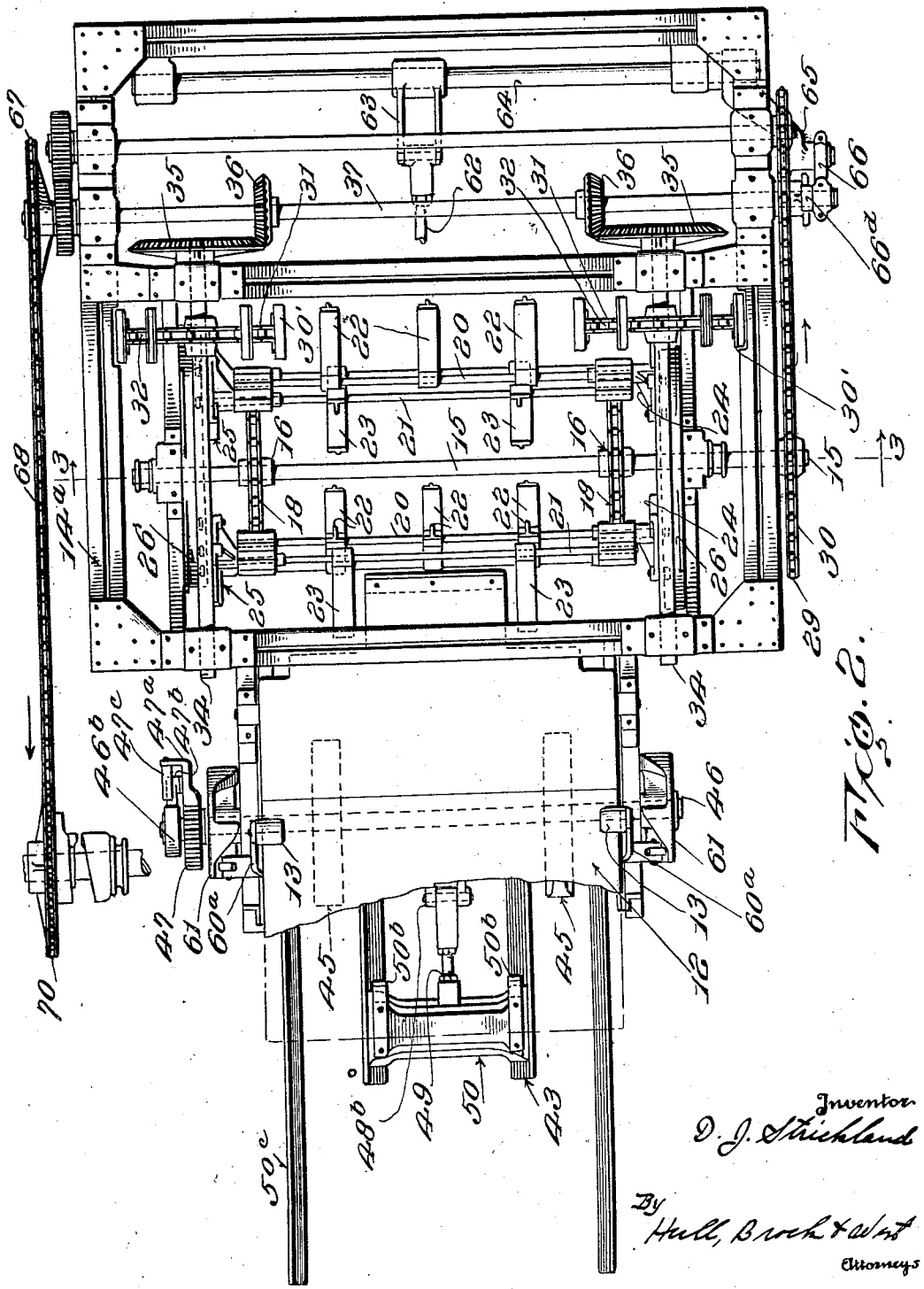

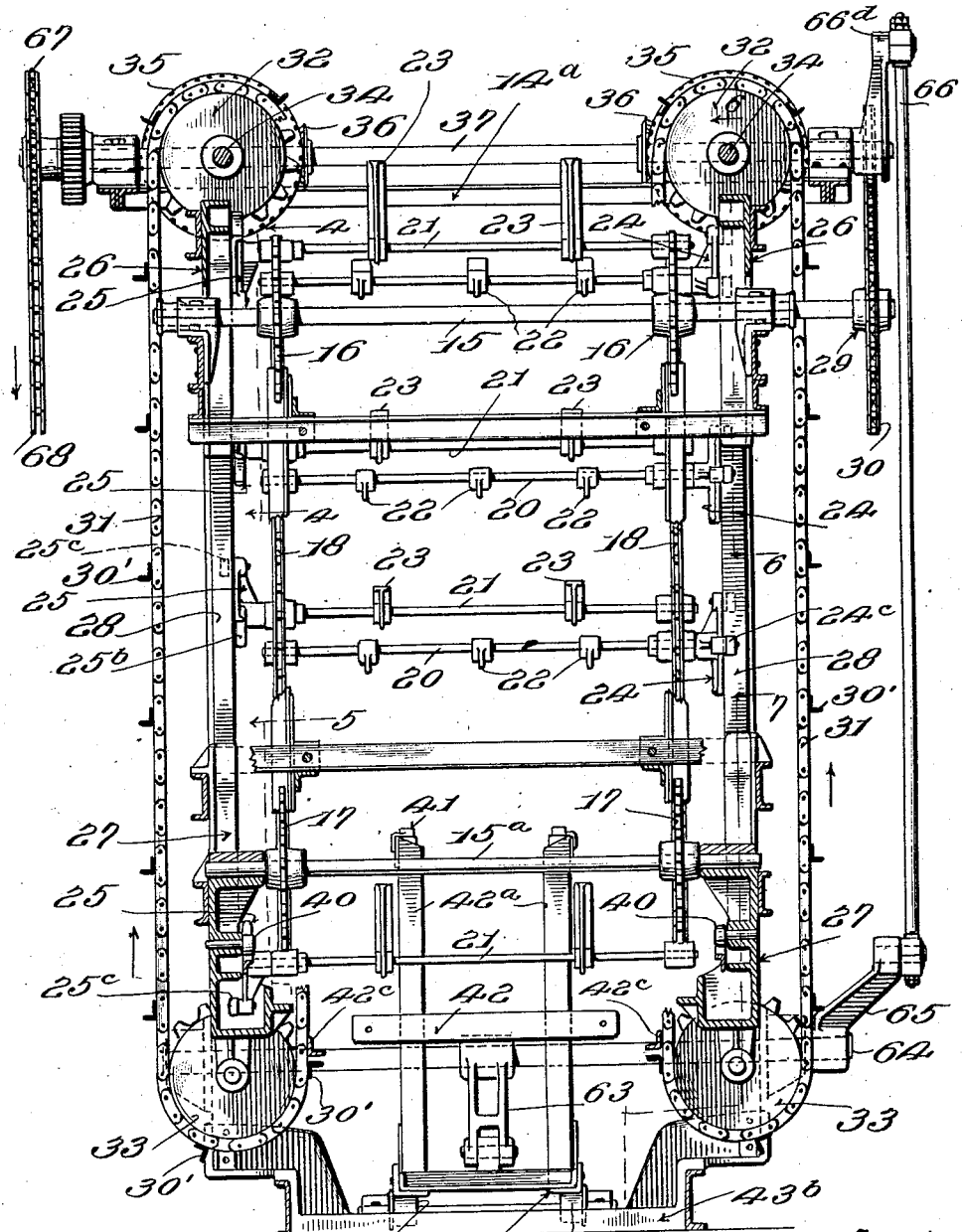

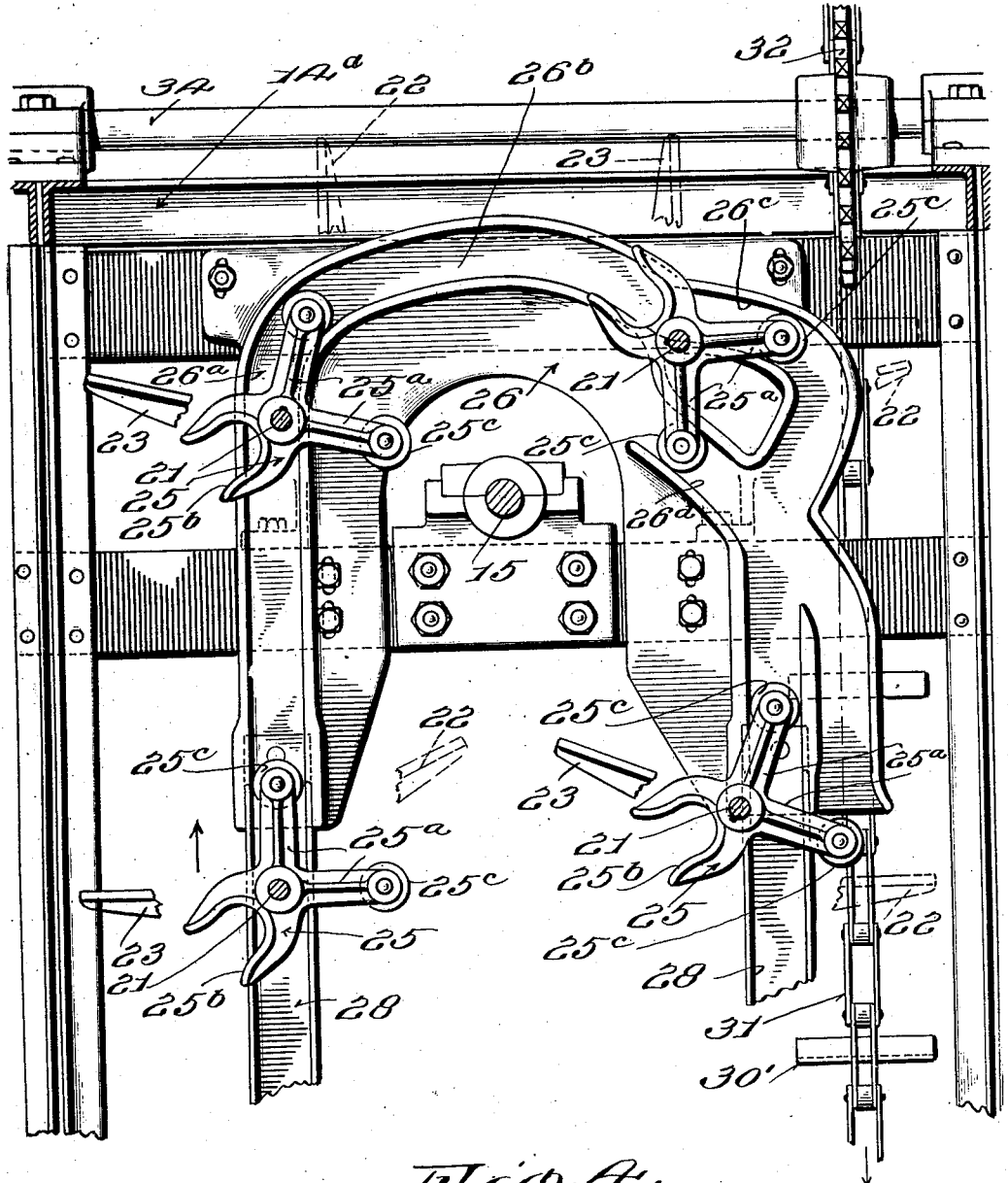

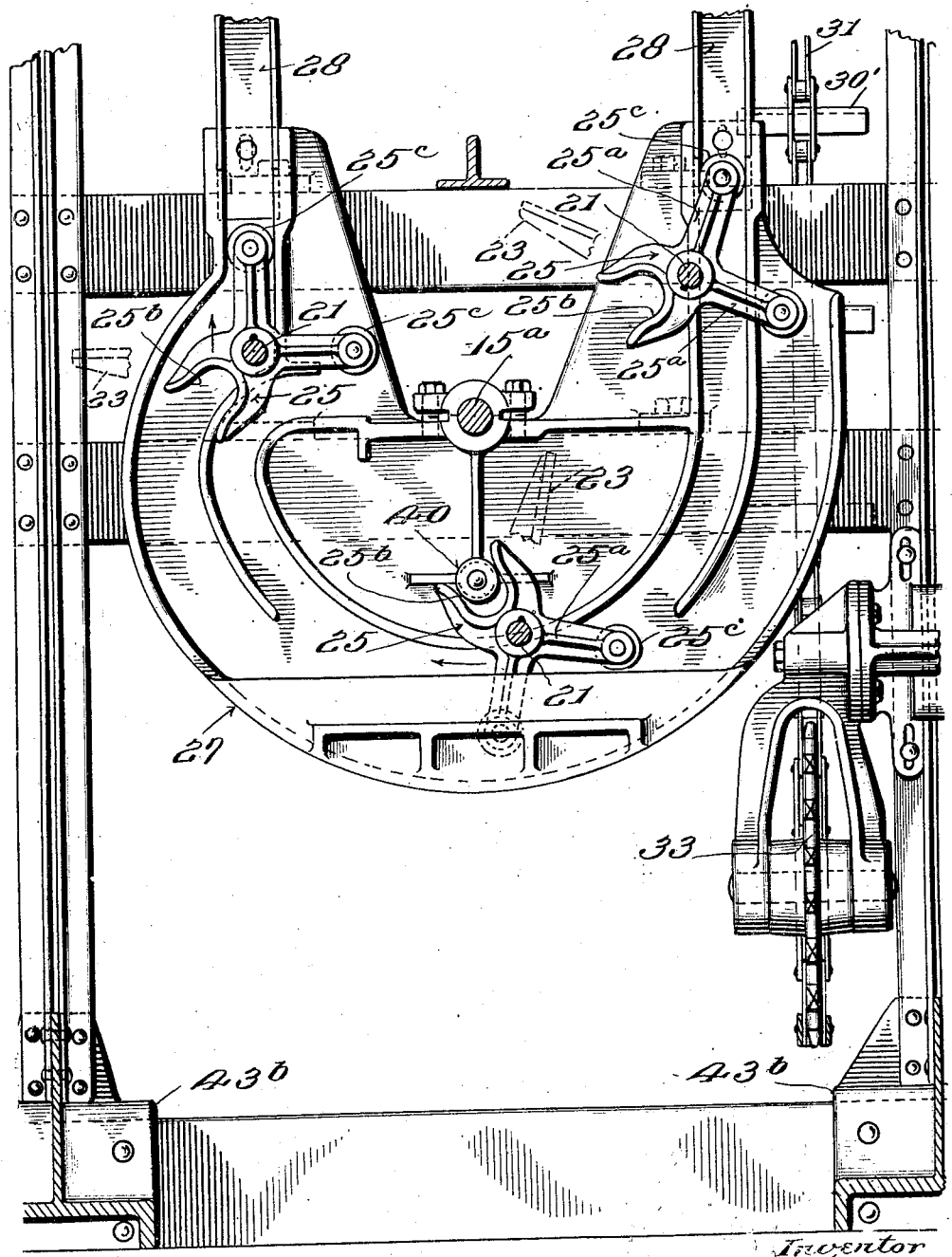

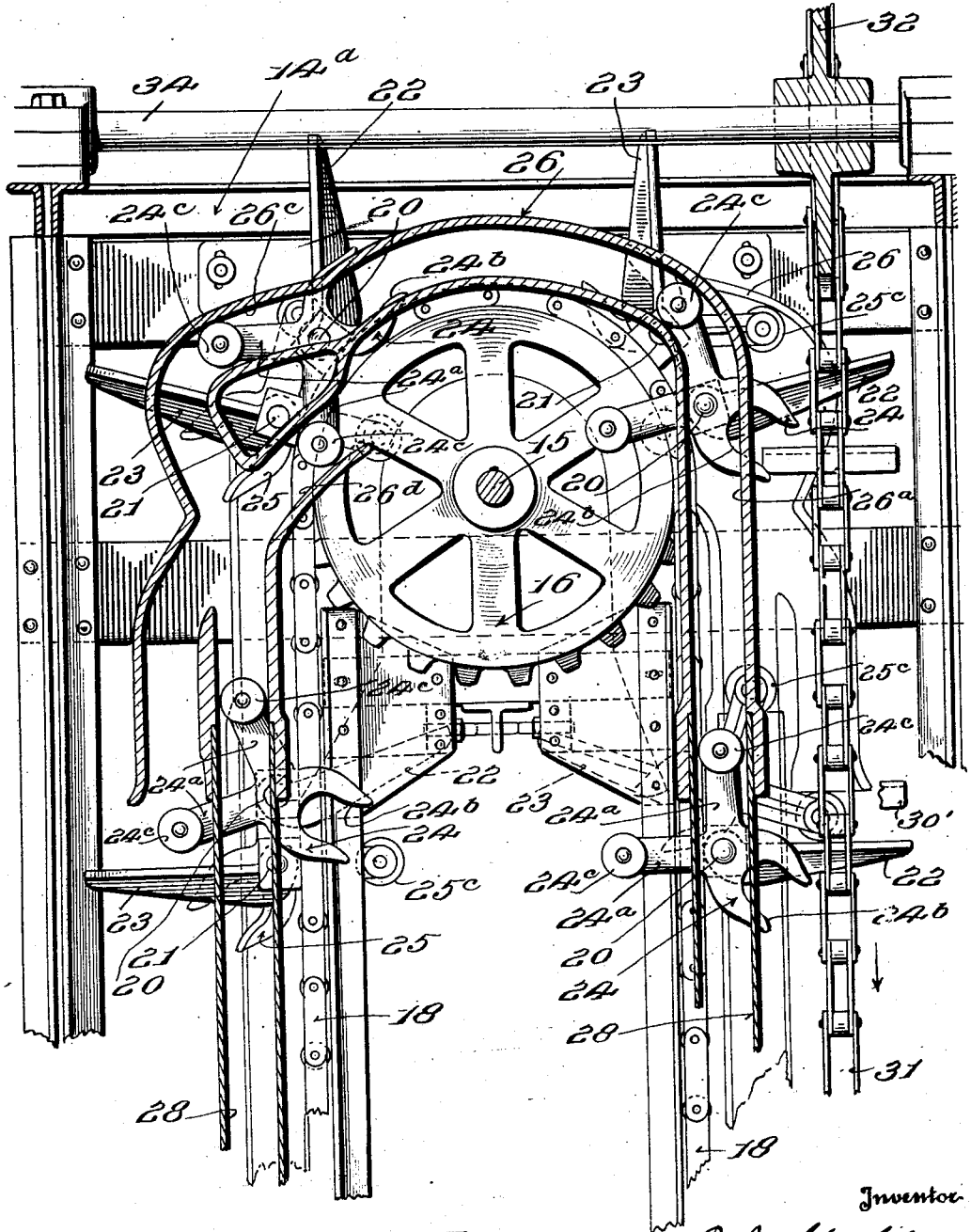

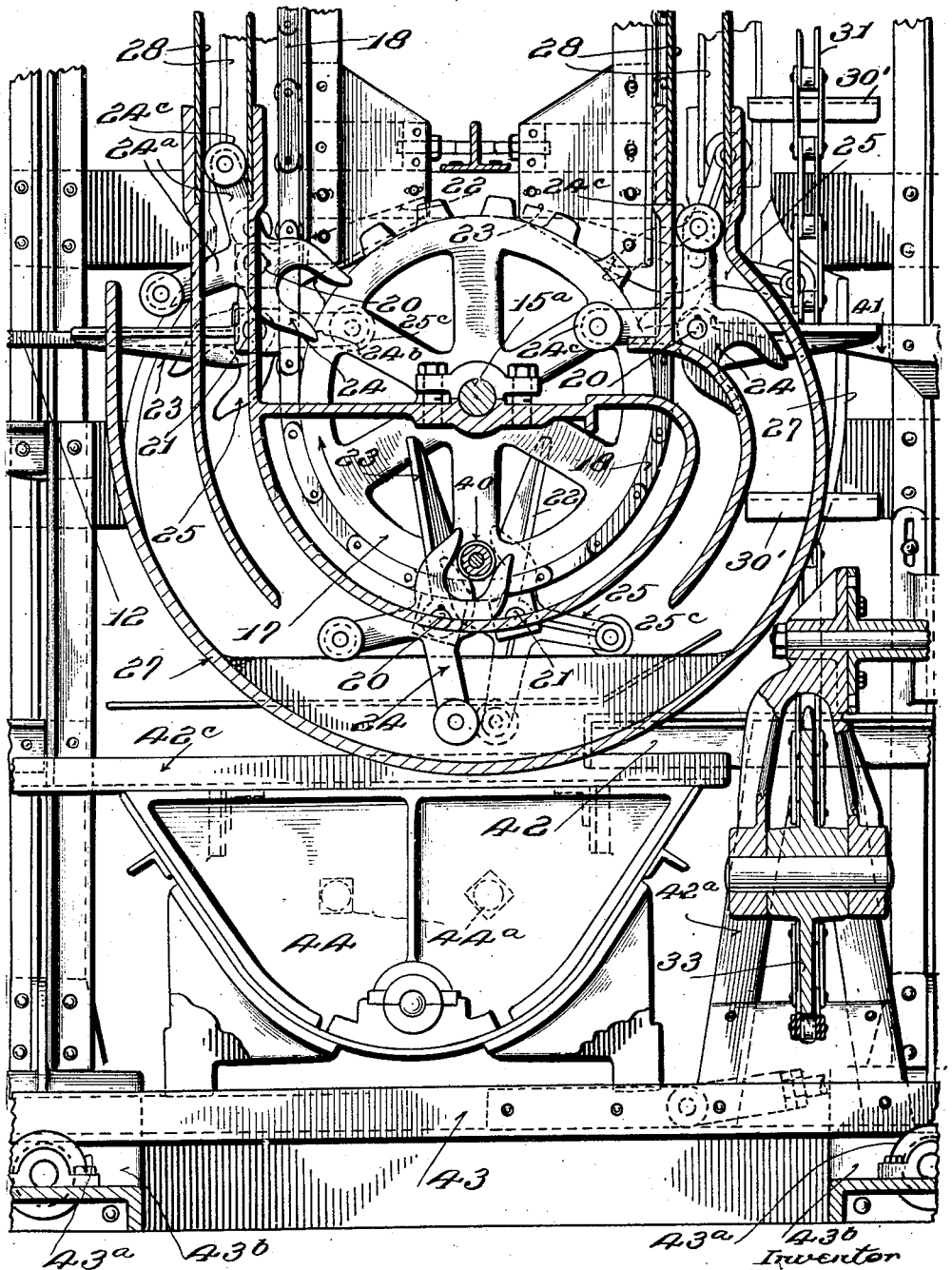

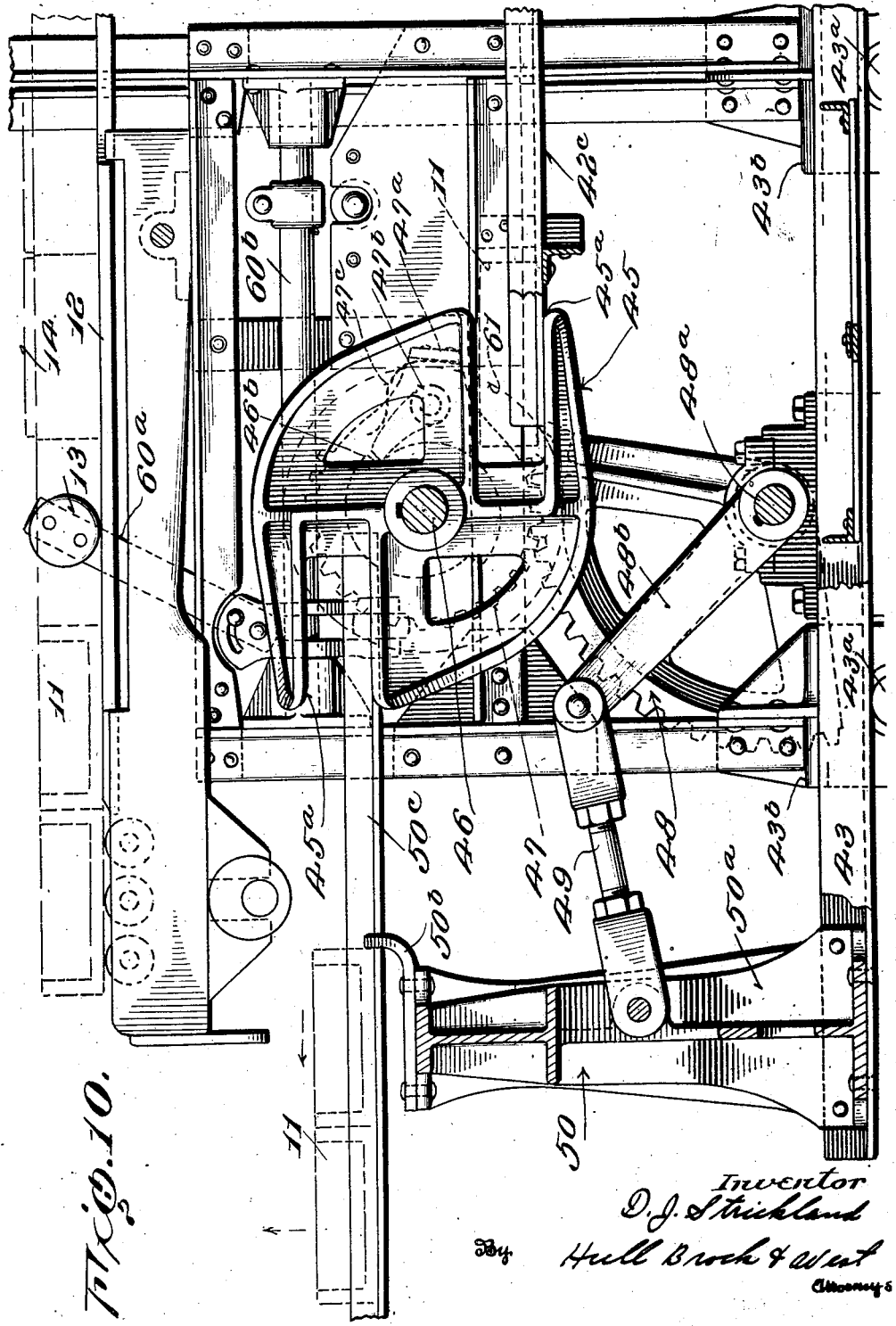

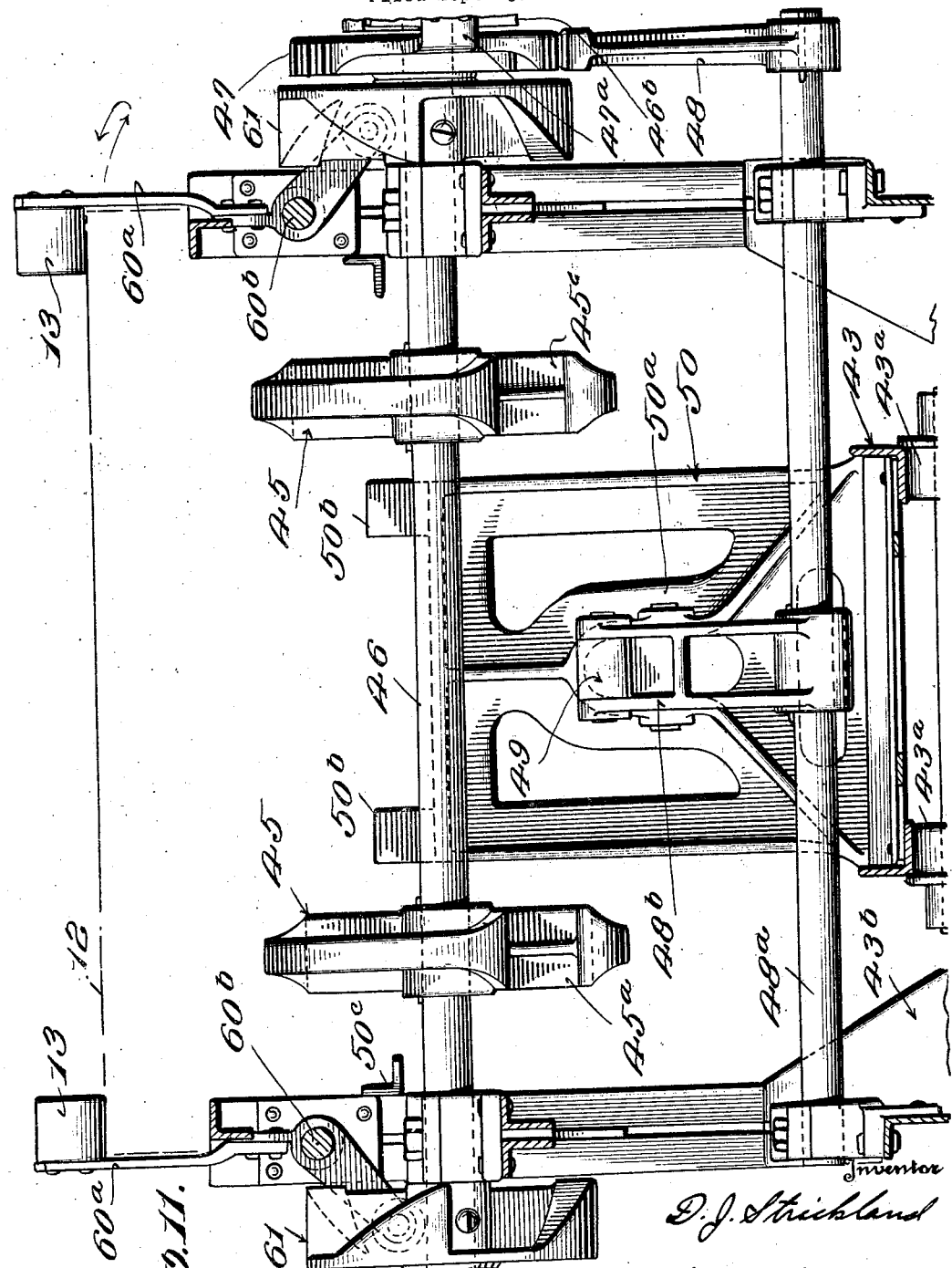

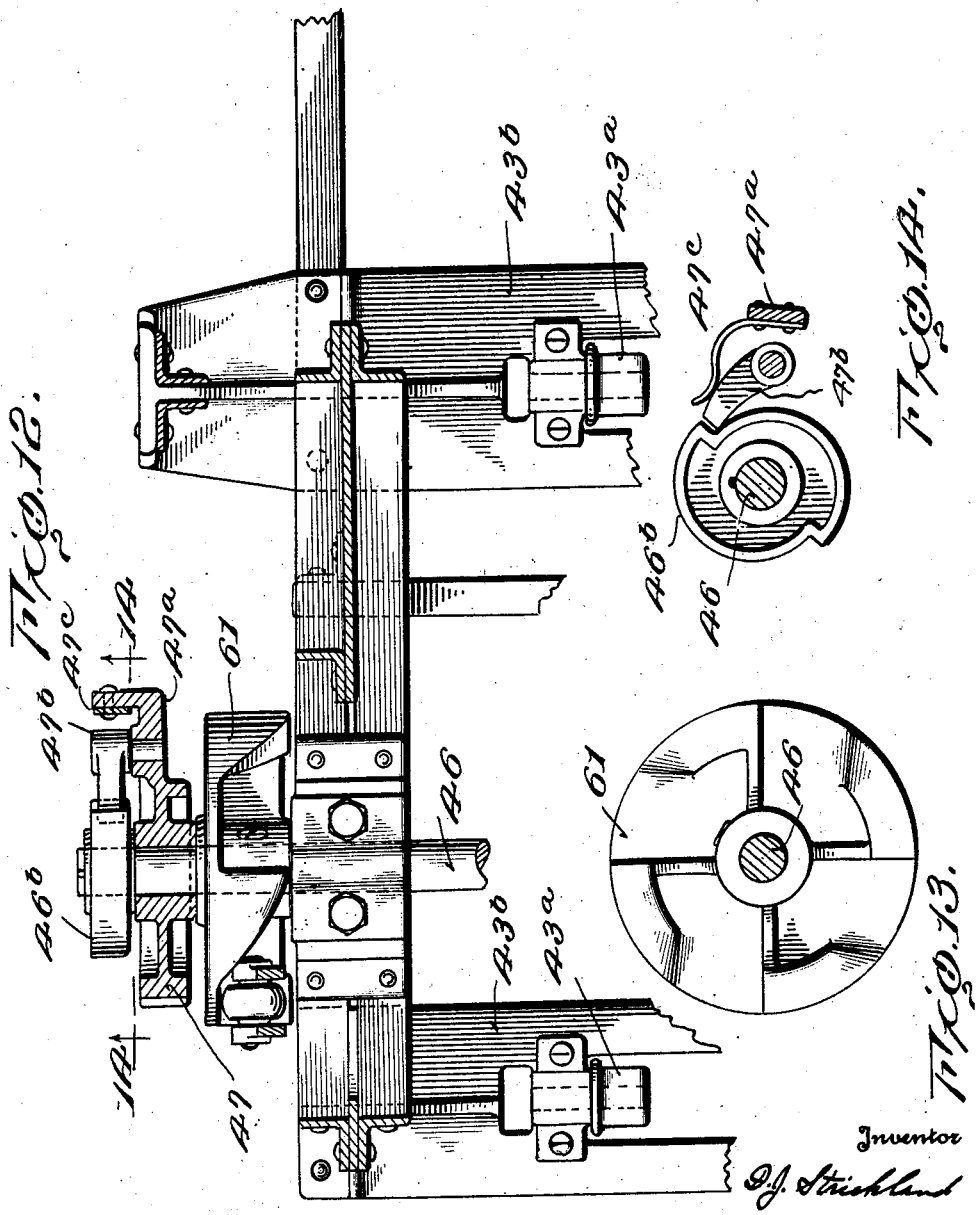

Aug. 24, 1926.
D. J. STRICKLAND
BRICK DUMPING APPARATUS
Filed Sept. 8, 1924
1,597,119
14 Sheets-Sheet 12
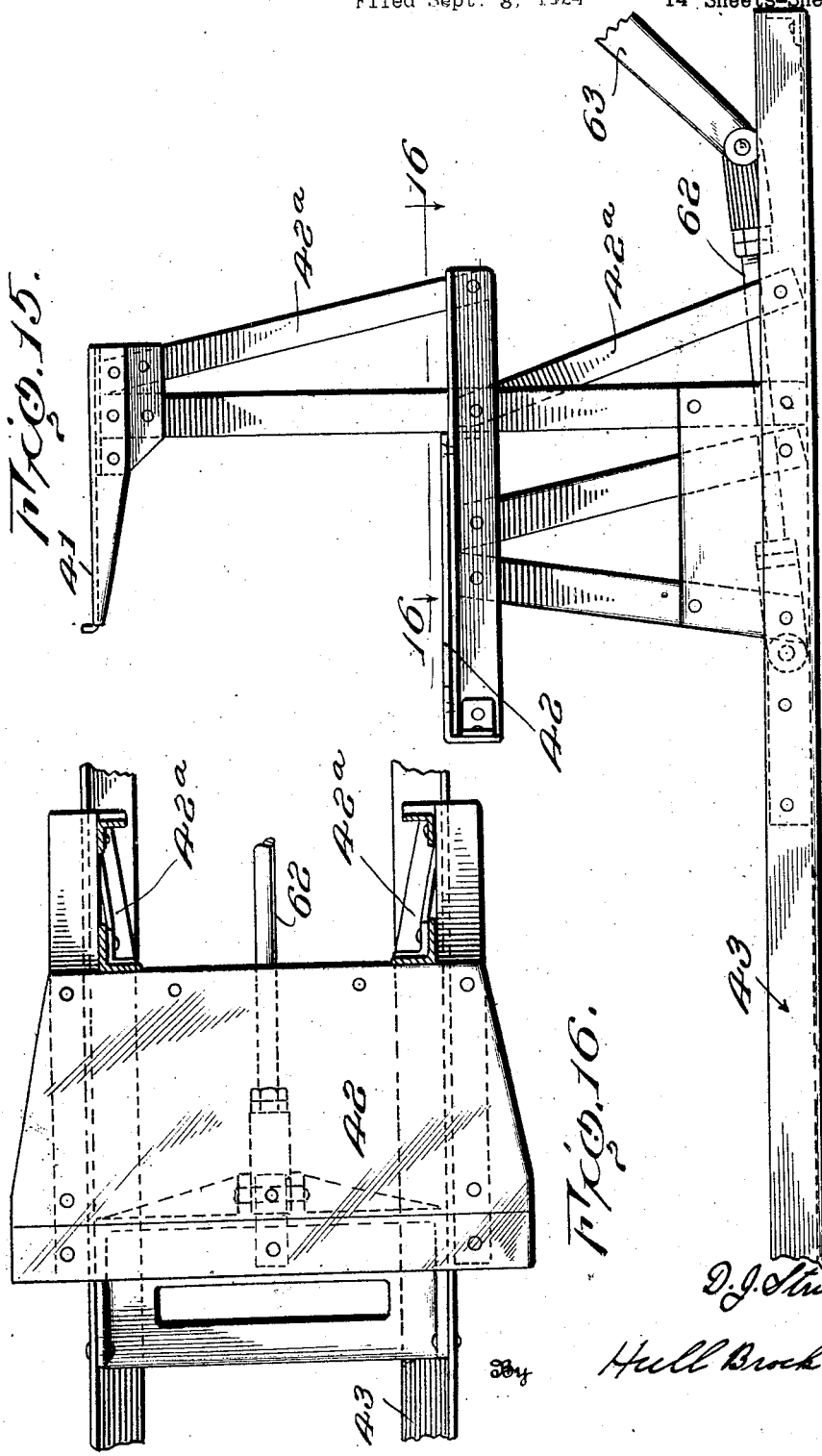

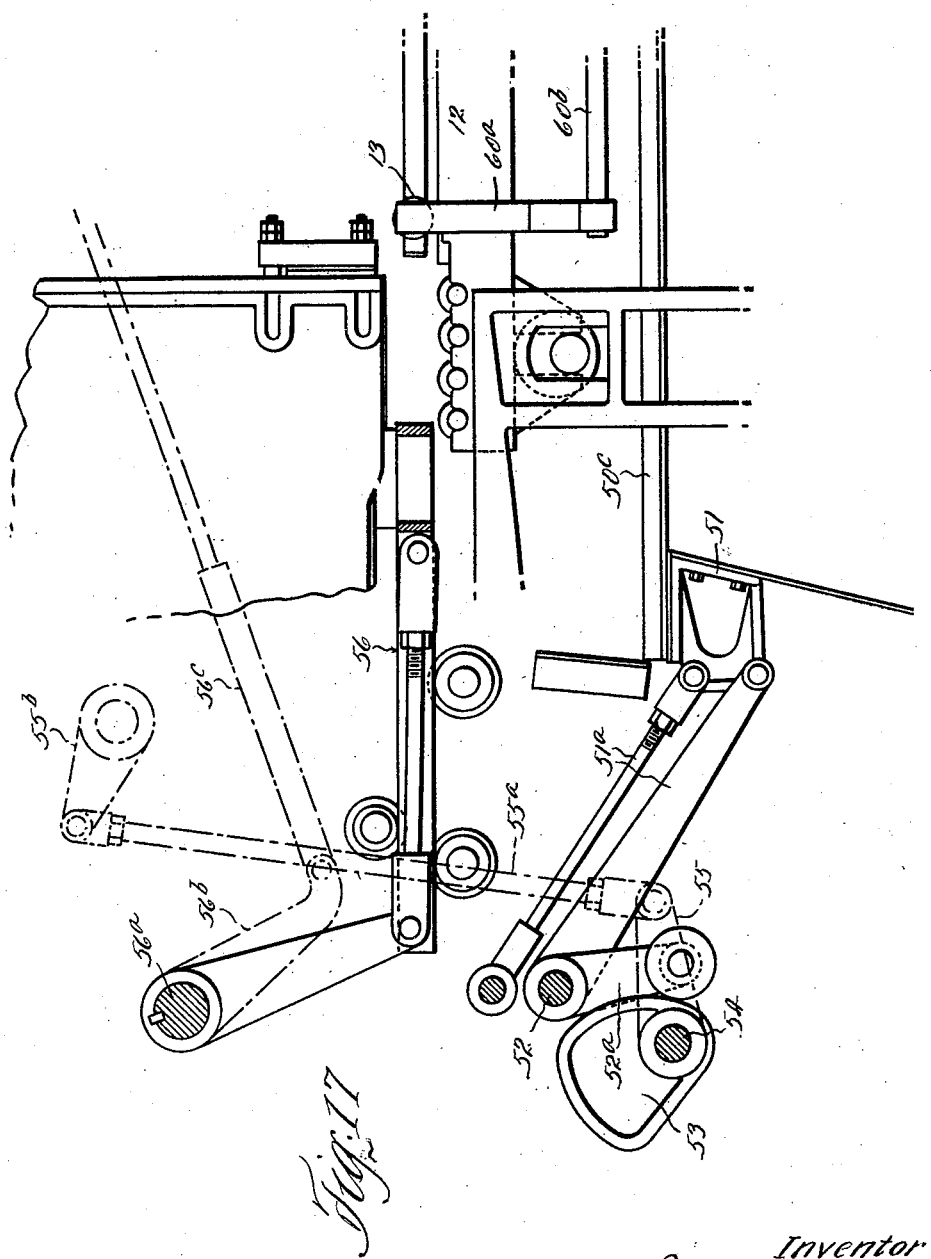

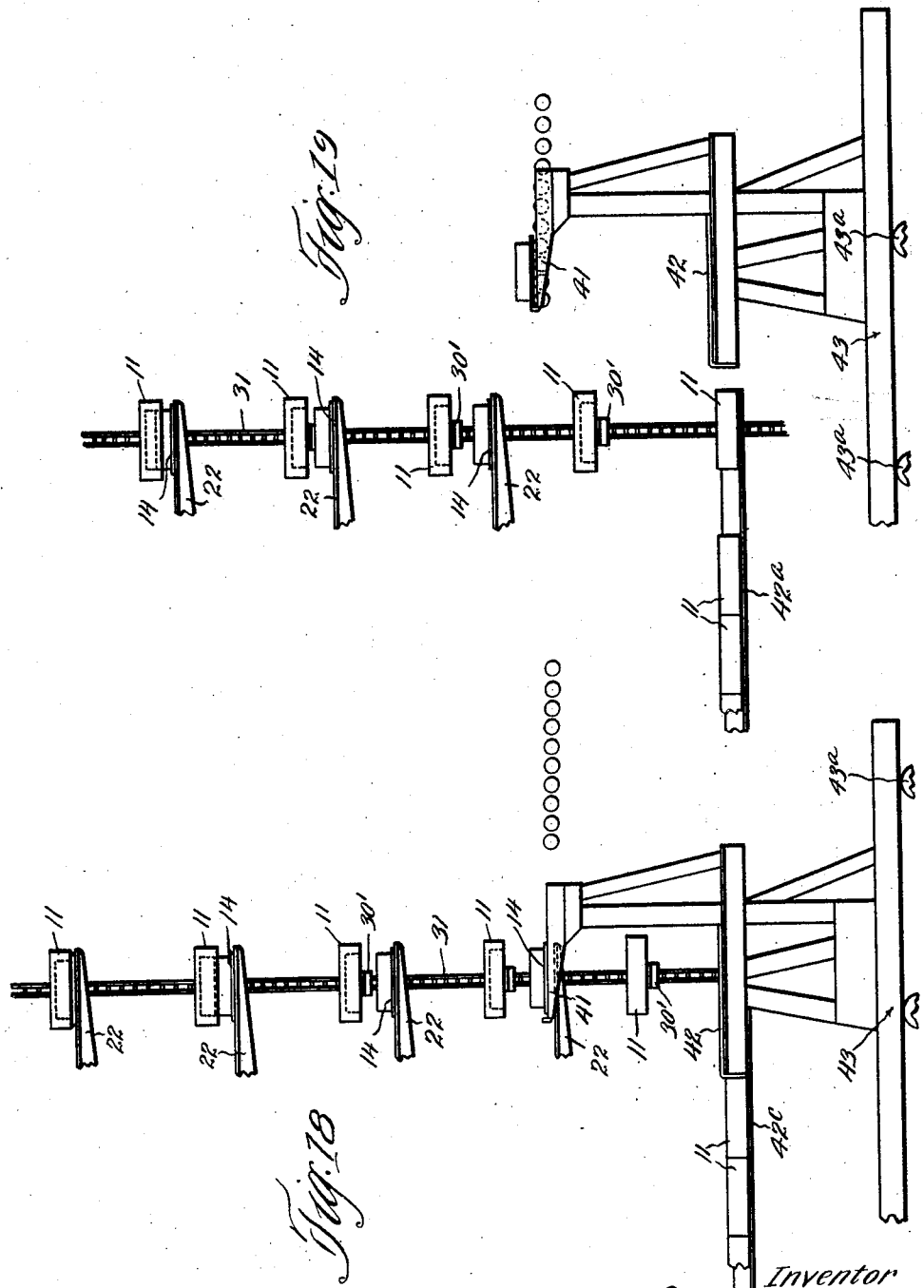

Patented Aug. 24, 1926.

1,597,119

UNITED STATES PATENT OFFICE.

DAVID J. STRICKLAND, OF CLEVELAND, OHIO.

BRICK-DUMPING APPARATUS.

Application filed September 8, 1924. Serial No. 736,539.

This invention relates generally to brick making machines, and more particularly to means for handling the molds after they have been filled with clay and discharged from the brick making machine. The object of the invention is to provide a simple, durable and efficient high speed apparatus which will receive the filled and palleted mold, empty said mold and move the pallet with the bricks thereon away from the mechanism; the molds being sanded and returned to the brick making device to receive therein another charge of clay.

In devices of this general character heretofore made and used, it has been common to press the clay into the mold, place a pallet upon the bricks in the mold, then invert the filled and palleted mold, lift the mold from the pallet and bricks, carrying the pallet with the bricks thereon away from the apparatus, while the inverted mold is sanded and returned to the brick molding apparatus for an additional charge.

In devices of this kind it is customary to make the molds with a plurality of compartments so that a plurality of bricks can be made at each filling of the mold, and in practice it has been found practical to employ molds having from six to nine and sometimes more compartments, so that from six to nine and sometimes more bricks can be molded at one and the same time.

The clay is forced into the molds under considerable pressure and in forcing the clay into the mold the air is of course excluded from the mold and consequently, when the mold is inverted for the purpose of discharging the bricks therefrom, there is a partial vacuum withholding the brick in the mold and this vacuum must be broken before the brick can be discharged unimpaired from the mold.

Efforts have been made to break the vacuum by knocking the molds at the ends and also tapping them upon the bottom after they have been inverted, but these operations are successful only when there is ample time for the mold and pallet to move away from each other, and in the cycle of operations of automatic brick making machines previously employed it has been found that very high speeds are impossible due to the period of time which must elapse for the free and easy separation of the brick and mold.

The object of my invention therefore is to provide a mechanism for handling the molds and pallets in such a manner that high speed of the apparatus as a whole can be obtained, and at the same time ample time given for the separation of the mold and brick, so that the bricks can be separated in commercially perfect condition from the molds.

This object I accomplish by moving the molds and pallets in the same direction first upwardly and then downwardly, and on the downward movement of both pallet and mold, cause the pallet to move at a relatively greater speed than the mold, whereby, the pallet with the bricks thereon is caused to move vertically away from the mold, the proper time unit being had, due to the fact that the mold and pallet are both moving in unison in the same direction but at relatively different speeds so that the operation is gradually taking place while the mold is being lowered, thereby gradually breaking the vacuum and permitting the bricks to emerge by gravity in their commercially perfect condition.

Another object of the invention is to so construct the apparatus that all of the operations can be accurately timed; and a still further object is to provide an apparatus of such a nature that all danger of disturbing the synchronous movements of the various parts is entirely avoided.

Other objects of the invention will become apparent as the description proceeds.

The invention consists in the various novel features of construction, and in the manner of combining or arranging the various parts, all of which will be fully described hereinafter and set forth in the appended claims.

In the drawings forming a part of this specification, Fig. 1 is a side view of a mold handling apparatus constructed in accordance with one embodiment of my invention; Fig. 2 is a plan view of the same; Fig. 3 is a transverse sectional view taken through what may be termed the tower of the machine and looking towards the rear; Figs. 4, 5, 6 and 7 are sectional views taken on the lines 4—4, 5—5, 6—6 and 7—7 respectively, of Fig. 3 and illustrate the manner in which the mold with the pallet thereon is raised, inverted and lowered; Fig. 8 is a detail sectional view showing the manner in which the mold and pallet are clamped together during the inverting operation; Fig. 9 is a fragmentary plan view of the apparatus shown in Fig. 8 on a somewhat smaller scale, the mold and pallet being omitted; Fig. 10 is a longitudinal sectional view through the forward portion of the machine or that portion adjacent the pug mill showing the mold inverter mechanism and the means for feeding the molds from the inverter mechanism to the mechanism for feeding them back to the pug mill; it also shows a mechanism by which the mold inverters are rotated intermittently through 180°; Fig. 11 is a transverse sectional view taken at right angles to Fig. 10 and showing the same mechanism; Fig. 12 is a detail sectional view showing the ratchet and pawl arrangement by which the inverter shaft is rotated intermittently; Fig. 13 is a face view of the bumper cam; Fig. 14 is a section on the line 14—14 of Fig. 12; Fig. 15 is a side elevation of the reciprocating carriage; Fig. 16 is a section on the line 16—16 of Fig. 15; Fig. 17 is a view illustrating the mechanism for lifting the sanded and inverted mold and feeding the same to the pug mill; and Figs. 18 and 19 are diagrammatic views showing the manner in which the molds and pallets are lowered, the pallets traveling somewhat faster than the molds thereby withdrawing the bricks from the molds; the mechanism for taking the pallet with the bricks thereon from the machine and the mechanism for feeding the emptied molds over the sander and to the inverter.

In carrying out my invention I employ a main frame 10 comprising side and connecting portions, the said side and connecting portions being composed of sills, uprights, side, top and connecting members of channel iron, angle iron or other suitable material.

What may be termed the forward end of the main frame is arranged in juxtaposition to the delivery end of a brick making machine of the pug mill type so that the filled molds 11, as they are discharged from the brick making machine are delivered upon a table 12 arranged upon the main frame and while the filled mold is at rest upon the table 12 it is bumped at each end by means of a hammer 13 in a manner hereafter explained.

A pallet 14 is then placed upon the bricks in the mold. After the mold has been bumped and the pallet arranged thereon, it is moved rearwardly by the next adjacent mold forced from the machine. This movement of the filled and palleted mold is toward the mechanism for dumping the bricks from the mold.

As previously stated it is of the utmost importance that ample time should be given for the separation of the bricks from the mold in order to insure commercially perfect bricks, and this I accomplish by raising the palleted molds one after another, carrying them vertically upwardly a definite distance, then in succession gradually inverting each filled and palleted mold and then carrying downwardly the series of pallets with the bricks thereon and at the same time carrying downwardly the series of molds, each mold, however, moving somewhat slower than its adjacent pallet with the bricks thereon, so that as the molds and pallets move in unison in the same general direction, the pallet gradually moves away from the mold making a complete separation without impairing the bricks.

In order to provide a proper mechanism for raising and separating the molds and pallets, I provide a tower 14$^a$ within which the mechanism is arranged. At the top of the tower I arrange a transverse horizontal shaft 15, and near the bottom of the tower I arrange a transverse horizontal shaft 15$^a$. Upon these shafts 15 and 15$^a$ are the upper sprockets 16 and the lower sprockets 17, the upper sprockets being spaced apart the desired distance and the lower sprockets are similarly spaced upon the lower shaft. Endless chains 18 travel around these upper and lower sprockets 16 and 17.

Connected to the parallel endless chains 18 are a series of horizontal shafts 20 and 21 journaled in suitable bearings connected to the chain at spaced points and it will be noted that the shafts 20 and 21 are arranged close together, the shaft 20 being a slight distance above the shaft 21 on the upward flight of the endless chain. Each shaft 20 has three pallet lowering fingers 22 rigidly connected thereto, and each shaft 21 has two mold lifting fingers 23 connected thereto.

Upon the end of each shaft 20 there is mounted a finger control crank 24, and upon the end of each shaft 21 there is also mounted a similar finger control crank 25. Each crank 24 comprises two arms 24$^a$ arranged at right angles to each other and also a fork 24$^b$ arranged at the juncture of the arms 24$^a$ but extending in the opposite direction, as most clearly shown in Figs. 6 and 7.

Each crank 25 consists of the arms 25$^a$ and the forked portion 25$^b$. Each arm 24$^a$ has a roller 24$^c$ mounted upon the end thereon and each crank arm 25$^a$ carries a freely turning roller 25$^c$ at the end thereof.

Connected to the tower and main frame are the upper cam track castings 26, the lower cam track castings 27 and the vertical tracks 28 which unite the upper and lower cam track castings.

The upper cam track castings 26 are similar, but their positions are reversed and the lower cam track sections 27 are also similar, and their positions are also reversed. This is because the finger control cranks are mounted at opposite ends of the shafts and consequently when one finger control crank is cooperating with its adjacent cam track, the finger control crank at the opposite end of the other shaft will be cooperating with its adjacent cam track. The same thing is true with reference to the cooperation between the finger control cranks and the lower cam tracks.

There are preferably nine shafts 20 and nine shafts 21 making eighteen shafts in all, and there are eighteen finger control cranks mounted upon the ends of the shafts. As before stated, the upper and lower cam track castings are connected by means of parallel vertical tracks 28. The upper shaft which carries the upper sprockets which in turn carry the endless chains 18 has a sprocket 29 upon the outer end thereof over which passes a sprocket chain 30 driven in a manner hereinafter described.

The sprocket 29 turning in the direction of the arrow causes the forward flight of the endless chain 18 to move upwardly and this upward movement of the chain carries with it the mold lifting fingers and pallet lowering fingers carried by the shafts 21 and 20 respectively.

The mold carrying fingers move upwardly through slots in the table and consequently lift the palleted mold upwardly and the mold lifting fingers are held in a horizontal position due to the fact that the roller 25$^c$ upon the end of the arm 25$^a$ travels in the track 28 and this position continues until the roller upon the vertical arm of the crank enters the curved portion 26$^a$ of the cam track 26 and as this arm of the crank travels around through the portion 26$^b$, the mold lifting finger is turned from the horizontal position to substantially a vertical position.

At the same time that the mold lifting fingers 23 carried by the shaft 21 are moving upwardly carrying the palleted mold thereon, the pallet lowering fingers which are carried by the shaft 20 just above the shaft 21 is also moving up and its finger control crank at the end thereof which is provided with arms 24$^c$ engage with their rollers the portions 26$^c$ and 26$^d$ of the upper track cam at the other side, and this engagement of the rollers at the ends of the crank arms causes the palleted lower fingers 22 to assume a substantially vertical position and in spaced parallelism with the mold lifting fingers 23 so that the inverted mold with the pallet thereon is carried between the mold lifting fingers 23 and the pallet lowering fingers 22 during the passage of the crank arms through the central portion of the upper cam tracks, as shown in Fig. 8.

After the chain with the shafts carrying the finger control cranks at their ends passes beyond the vertical center, the finger control cranks come into engagement with the opposite portions of said cams, that is, the finger control cranks upon the shaft 21 engage the portions 26$^c$ and 26$^d$ and the finger control cranks upon the ends of the shaft 20 engage the portions 26$^b$ and 26$^a$ of the cam track castings. This engagement of these elements in the manner set forth causes the pallet lowering fingers to assume a horizontal position inasmuch as the upright crank arm travels down the straight portion 26$^a$ into the track 28 and the mold lifting fingers drop back to a substantially horizontal position and they travel downwardly in unison with the pallet lowering fingers, and it will be noted that the forked portions 24$^b$ and 25$^b$ are projected in reverse directions at oblique angles upon both the up flight and down flight of the chain 18.

It will be understood that when the palleted mold is turned to a vertical position and carried over the vertical center of the endless chain, the pallet with the mold thereon is transferred to the pallet lowering finger 22 which at this time is descending and the mold lifting finger as previously stated drops back to a substantially horizontal position and continues so during the down flight of the chain.

At the same time that the pallet lowering fingers are traveling downwardly the empty molds are caught upon oppositely arranged cleats 30' carried by the endless chains 31 traveling around upper sprockets 32 and lower sprockets 33, the sprockets 32 being mounted upon shafts 34 carrying bevel gears 35 at their ends which in turn mesh with bevel gears 36 carried upon the shaft 37 and rotated in a manner hereinafter explained.

The speed of the endless chains 31 is sufficiently slower than the speed of the chains 18 to permit the pallets with the brick thereon, carried by the pallet lowering fingers 22, to move gradually away from the molds while the said molds and pallets with bricks thereon are descending in the same vertical plane. By this method four molds can be acted upon at one and the same time, that is four molds can be descending at one and the same time and their respective pallets gradually moving away from said molds due to the fact that the pallet lowering fingers are moving faster than the mold carrying cleats.

The pallet with the mold thereon finally reaches a pallet rest hereafter fully described and the bricks are transferred therefrom in any suitable manner. The mold continues downwardly and comes to rest in advance of a mold pusher hereafter described.

The shafts 20 and 21 are carried around below the lower sprockets and the finger control cranks at the ends of said shafts come into cooperative engagement with the lower cam track casting 27 which, as before stated, are arranged reversely in pairs.

Each lower cam track casting has a roller 40 upon a stud shaft directly in line with the lower sprocket shaft and below the same. These rollers 40 are engaged by the forked portions 24$^b$ and 25$^b$ of the crank arms 24 and 25 and as the chains pass around, these forked members, pivoting on the rollers 40, cause the crank arms to be reversed bringing the mold lifting fingers and pallet lowering fingers into their proper relative positions on the upward flight of the sprocket chains.

The pallet rest 41 and the mold pusher 42 are carried by standards 42$^a$ connected to a horizontally reciprocating carriage 43 travelling upon rollers 43$^a$ carried in yokes 43$^b$ attached to the main frame.

The molds are pushed along guides 42$^c$ across the top of a sand box 44 in which rotate sand distributors 44$^a$ which throw the sand upwardly and thoroughly coat the interior of the inverted mold. The sand box extends to one side of the main frame, in order to permit the sand to be supplied from time to time.

A series of molds are being pushed at one time, step by step, across the sander and the foremost one of the series is pushed into the mold receiving openings 45$^a$ of the mold inverter 45. The mold inverter 45 consists of two castings mounted upon a shaft 46 and having oppositely disposed mold receiving openings or recesses 45$^a$ into which the mold is pushed as previously described. Mounted upon the shaft 46 is a mutilated gear 47 having an extension 47$^a$ to which is pivoted a pawl 47$^b$ and a spring 47$^c$ bearing upon said pawl. This pawl 47$^b$ engages a ratchet 46$^b$ mounted upon the shaft 46 and by means of which the shaft is caused to make one half a revolution and stop and then another half revolution, thereby bringing the mold receiving openings or recesses 45$^a$ into proper position to receive the mold.

The mutilated gear is operated by a toothed segment 48 carried by a rock shaft 48$^a$ mounted near the bottom of the main frame and this rock shaft has a crank arm 48$^b$ connected thereto, this crank arm being connected at its upper end to an adjustable pitman rod 49 pivotally connected to the standard or frame 50$^a$ of the mold advancer 50; this mold advancer frame being carried by the forward end of the reciprocable carriage 43. The mold advancer therefore moves back and forth with the reciprocating carriage and upon the limit of its rearward movement the inverted sanded mold is placed thereon, and as the carriage moves forward the mold advancer is carried with it and also the sanded mold, the mold advancer having its rear edge flanged as shown at 50$^b$ to insure the proper movement of the mold along the guides 50$^c$. The mold is here picked up by the mold elevator 51 carried at the end of the arms 51$^a$ mounted upon a rock shaft 52, carrying a roller arm 52$^a$ which is engaged by a cam 53 carried by a rock shaft 54 having a crank arm 55 to which is attached a pitman rod 55$^a$ operated by a crank arm 55$^b$ attached to one of the pug mill shafts.

When the mold is elevated as just described it is placed beneath the pug mill die by means of a mold placer 56 operated from the rock shaft 56$^a$ having a crank arm 56$^b$ at its end and having a pitman rod 56$^c$ connected thereto and also to a crank arm 56$^d$ at the end of the plunger crank shaft.

The mold is knocked by hammers 13 carried by the upper ends of the arms 60$^a$ pivoted on rock shafts 60$^b$ and the ends of these arms are engaged by ratchet cams 61 mounted also on the inverter shaft; and consequently the hammers 13 will have an intermittent motion striking the ends of the filled mold as the mold inverter is turning the sanded mold over ready to be advanced.

The reciprocating carriage is moved back and forth by means of pitman 62 connected to an arm 63 carried by a rock shaft 64 having a crank arm 65 at its outer end projecting beyond the main frame, and this crank arm is operated by a pitman rod 66 which, at its upper end, is connected to a crank arm 66$^d$ mounted at the end of the shaft 37 arranged upon the top of the tower and carrying the bevel gears 36 which in turn mesh with the bevel gears 35 upon the ends of the shafts 34 carrying the sprockets 33 which in turn operate the mold lower chains 31.

The shaft 37 has a sprocket 67 at its outer end over which travels the sprocket chain 68 operated from a sprocket wheel 70 mounted on the plunger crank shaft.

From the foregoing description taken in connection with the accompanying drawings it will be seen that I provide a simple and compact device which is driven from the pug mill and which efficiently operates to separate the pallets and molds in a gradual manner and while they are moving in the same direction. Furthermore, it will be noted that a plurality of molds and pallets are all moving in unison and all in the same direction so that the proper time interval is had for the proper separation of the bricks from the molds. It will also be noted that the pallet mover, mold pusher, mold inverter and mold advancer are all operated in unison from a reciprocating carriage, which in turn receives its motion from the mold lifting and pallet lowering mechanism.

A device constructed as herein shown can be driven at high speed and still give the proper time interval for the separation of the bricks and molds.

Having thus described my invention what I claim is:—

1. In a machine of the kind described, the combination with a main frame having a vertical tower, of a reciprocating carriage movable in said frame, a mold pusher and a mold advancer connected to said carriage, a mold inverter operable from the carriage and means for raising the molds and lowering the pallets and means for lowering the molds.

2. The combination with a main frame, of a reciprocating carriage movable in said frame, a sander arranged in said frame, means connected to said carriage for pushing inverted molds across the top of said sander, a mold inverter operable from said carriage, and a mold advancer connected to said frame.

3. The combination with a main frame, of a reciprocating carriage movable therein, a mold pusher and a mold advancer connected to said carriage, a mold inverter, and means for rotating the same at predetermined periods, said means being operable from the carriage.

4. The combination with a frame, of a reciprocating carriage, a pallet receiver and mold pusher attached to one end of said carrier, a mold advancer connected to the opposite end of said carriage, and a mold inverter arranged in the main frame intermediate the mold pusher and mold advancer.

5. The combination with a frame, of a reciprocating carriage, a pallet receiver and mold pusher attached to one end of said carriage, a mold advancer connected to the opposite end of said carriage, and a mold inverter arranged in the main frame intermediate the mold pusher and mold advancer, and a sander intermediate the mold pusher and inverter.

6. The combination with a frame, of a reciprocating carriage, a pallet receiver and mold pusher attached to one end of said carriage, a mold advancer connected to the opposite end of said carriage, and a mold inverter arranged in the main frame intermediate the mold pusher and mold advancer, said inverter being operable from the carriage.

7. The combination with a main frame, of a reciprocating carriage, a mold inverter arranged in said frame and rotatable at predetermined periods, and a mold bumper, said inverter and bumper being operable from the carriage.

8. The combination with a main frame, of a reciprocating carriage, a mold pusher and a mold advancer connected to said carriage, a sander in advance of the pusher and an inverter in advance of the sander, a mold bumper, and means operatively connected with the carriage for rotating the inverter and rocking the bumper.

9. The combination with a main frame having a tower, of means operable in said frame and tower for raising and inverting a palleted mold, and lower said pallet, and means also operable in said tower and frame for lowering the mold.

10. The combination with a main frame having a tower, of means operable in said tower and frame for raising a palleted mold, inverting the same and lowering the pallet, and means for lowering the mold, said mold lowering means moving at a speed less than the speed of the pallet lowering means.

11. The combination with a main frame having a tower, of means operable in said tower and frame for raising a palleted mold, inverting the same and lowering the pallet and means for lowering the mold, said mold lowering means moving at a speed less than the speed of the pallet lowering means, and a pallet receiver movable into and out of the path of the descending pallet.

12. The combination with a main frame having a tower, of means operable in said tower and frame for raising a palleted mold, inverting the same and lowering the pallet, and means for lowering the mold, said mold lowering means moving at a speed less than the speed of the pallet lowering means, and a mold pusher adapted to push the inverted mold from the mold lowering means.

13. The combination with a main frame having a tower, of means operable in said tower and a frame for raising a palleted mold, inverting the same and lowering the pallet, and means for lowering the mold, said mold lowering means moving at a speed less than the speed of the pallet lowering means, and a pallet receiver movable into and out of the path of the descending pallet, and a mold pusher adapted to push the inverted mold from the mold lowering means.

14. The combination with a main frame having a vertical tower, of a reciprocating carriage movable in the frame, means operable in the tower and frame for raising a palleted mold, inverting the same and lowering the pallet, means for lowering the mold, said mold lowering means moving slower than the pallet lowering means, and a pallet receiver connected to the carriage and adapted to receive the pallet.

15. The combination with a main frame having a tower, of a reciprocating carriage movable in the frame, means operable in said tower and frame for raising a palleted mold, inverting the same and lowering the pallet, means for lowering the mold, said mold lowering means moving slower than the pallet lowering means, a pallet receiver and a mold pusher connected to the carriage and operating upon the pallet and mold, so lowered.

16. The combination with a main frame having a tower, of a reciprocating carriage movable in the frame, means operable in said tower and frame for raising a palleted mold, inverting the same and lowering the pallet, means for lowering the mold, said mold lowering means moving slower than the pallet lowering means, a pallet receiver and a mold pusher connected to the carriage and operating upon the pallet and mold, so lowered, and a mold inverter operably connected with the carriage.

17. The combination with a main frame having a tower, of a reciprocating carriage movable in the frame, means operable in said tower and frame for raising a palleted mold, inverting the same and lowering the pallet, means for lowering the mold, said mold lowering means moving slower than the pallet lowering means, a pallet receiver and a mold pusher connected to the carriage and operating upon the pallet and mold, so lowered, a mold inverter operably connected with the carriage, and a mold advancer connected to the carriage and adapted to advance the mold from the inverter.

18. The combination with a main frame having a tower, of a reciprocating carriage movable in the frame, means operable in said tower and frame for raising a palleted mold, inverting the same and lowering the pallet, means for lowering the mold, said mold lowering means moving slower than the pallet lowering means, a pallet receiver and a mold pusher connected to the carriage and operating upon the pallet and mold, so lowered, a mold inverter operably connected with the carriage, a mold advancer connected to the carriage and adapted to advance the mold from the inverter, and a sander between the mold pusher and inverter and over which the inverted mold is pushed.

19. The combination with a main frame having a tower, of a reciprocating carriage movable in the frame, means operable in said tower and frame for raising a palleted mold, inverting the same and lowering the pallet, means for lowering the mold, said mold lowering means moving slower than the pallet lowering means, a pallet receiver and a mold pusher connected to the carriage and operating upon the pallet and mold, so lowered, a mold inverter operably connected with the carriage, a mold advancer connected to the carriage and adapted to advance the mold from the inverter, a sander between the mold pusher and inverter and over which the inverted mold is pushed, a mold lifter adapted to lift the mold from the advancer, and a mold placer to move the mold in place from the lifter.

20. The combination with a main frame and tower, of a reciprocating carriage movable in the frame, endless carriers movable in the tower and frame for raising a palleted mold, inverting the same and lowering the pallet, endless carriers for lowering the mold, said mold lowering carriers moving slower than the pallet lowering carriers, a pallet receiver, a mold pusher and a mold advancer connected to the carriage, a mold inverter and means operatively connected with the carriage for rotating said inverter at definite periods.

21. The combination with a main frame and tower, of a reciprocating carriage movable in the frame, endless carriers movable in the tower and frame for raising a palleted mold, inverting the same and lowering the pallet, endless carriers for lowering the mold, said mold lowering carriers moving slower than the pallet lowering carriers, a pallet receiver, a mold pusher and a mold advancer connected to the carriage, a sander arranged in the frame between the mold pusher and inverter, a mold inverter and means operatively connected with the carriage for rotating said inverter at definite periods.

22. The combination with a main frame having a tower, of a reciprocating carriage having a pallet receiver, mold pusher and mold advancer connected therewith, a mold inverter arranged in the frame and operable from the carriage, endless carriers of differential speed movable in the tower and frame for raising a palleted mold, inverting the same, and simultaneously lowering and separating the pallet and mold, and operative means between the carriers and carriage.

23. In a machine of the kind described, the combination with an endless chain, of shafts arranged in pair and connected to said chain, mold lifting fingers carried by one shaft, pallet lowering fingers carried by the other shaft, and means for rocking said shafts in reverse directions whereby said fingers first approach each other and then recede.

24. In a device of the kind described, the combination with means for carrying and reversing a filled and palleted mold, of means for receiving and carrying the emptied mold while the pallet with the bricks thereon remains upon the first named carrying means, said second named means having a movement relatively slower than the first named means.

25. In a device of the kind described, the combination with means raising and inverting a filled and palleted mold, of means for receiving and lowering the inverted mold, said mold lowering means moving in the same general direction as the pallet carrying means but at a relatively slower speed whereby the pallet, with the bricks thereon are moved vertically away from the mold.

26. In a device of the kind described, an endless traveling means for carrying and inverting a filled and palleted mold, and an endless traveling means for receiving and lowering the inverted mold, said endless traveling devices having such relatively different speeds that the pallet with bricks thereon moves in unison with but vertically away from the mold.

27. In a device of the kind described, means for lifting and inverting a filled and palleted mold, in combination with means moving in the path of the descending mold and retarding its descent while the pallet and bricks thereon move vertically away from said mold.

28. In a device of the kind described, the combination with a pair of endless chains and means for moving the same, of a pair of shafts carried by said chains, mold lifting fingers connected to one shaft, pallet lowering fingers connected to the other shaft and means carried at the ends of said shafts cooperating with stationary means for causing said fingers to move toward each other at the end of the upper flight of said chains and away from each other at the beginning of the downward flight of said chains.

29. In a device of the kind described, the combination with a pair of shafts and endless chains carrying the same, of crank arms and rollers carried at the ends of said shafts, and tracks including upper and lower cam sections for rocking said shafts at definite periods, and mold lifting fingers upon one shaft and pallet lowering fingers upon the other shaft.

30. In a device of the kind described, the combination with endless chains provided respectively with mold lifting and pallet lowering fingers, said shafts carrying means cooperative with stationary means for bringing the said fingers toward each other and then away from each other, and endless chains provided with cleats to receive the empty mold, the adjacent flights of said endless chains traveling in the same direction but at different speeds.

In testimony whereof, I hereunto affix my signature.

DAVID J. STRICKLAND.